United States Patent [19]

O'Maley

[11] 4,179,685

[45] Dec. 18, 1979

[54] AUTOMATIC CURRENCY IDENTIFICATION SYSTEM

[75] Inventor: James B. O'Maley, Lighthouse Point, Fla.

[73] Assignee: Abbott Coin Counter Company, Inc., Stamford, Conn.

[21] Appl. No.: 739,424

[22] Filed: Nov. 8, 1976

[51] Int. Cl.[2] .......................... G06K 9/00; B07C 5/342

[52] U.S. Cl. ............................ 340/146.3 H; 209/534; 250/556; 340/146.3 AQ; 340/146.3 R

[58] Field of Search .............. 209/DIG. 2, 111.7, 534, 209/539; 250/556, 557, 226; 340/146.3 AC, 146.3 R, 146.3 F, 146.39 H, 146.39 Y, 146.39 J, 146.39 AQ, 146.39 Q; 235/61.11 K, 425; 356/71

[56] References Cited

U.S. PATENT DOCUMENTS

| | | | |
|---|---|---|---|
| 3,239,814 | 3/1966 | Willie | 250/556 |
| 3,419,724 | 12/1968 | Bayha | 250/556 |
| 3,432,673 | 3/1969 | Mader | 340/146.3 H |
| 3,443,107 | 5/1969 | Modglin | 250/556 |
| 3,496,370 | 2/1970 | Haville et al. | 250/556 |
| 3,582,898 | 6/1971 | Le May | 340/146.3 Q |
| 3,593,287 | 7/1971 | Kobayashi et al. | 340/146.3 J |
| 3,710,319 | 1/1973 | Miller et al. | 340/146.3 J |
| 3,725,667 | 3/1973 | Schwartz | 209/DIG. 2 |
| 3,760,357 | 9/1973 | Inose et al. | 340/146.3 H |
| 3,782,543 | 1/1974 | Martelli et al. | 209/DIG. 2 |
| 3,870,629 | 3/1975 | Carter et al. | 209/DIG. 2 |
| 3,967,243 | 6/1976 | Kawa | 340/146.3 H |
| 4,041,456 | 8/1977 | Ott et al. | 340/146.3 Q |

OTHER PUBLICATIONS

Cutaia, "Multilevel Character Recognition System", *IBM Tech. Disclosure Bulletin,* vol. 13, No. 12, May 1971, pp. 3739-3742.

*Primary Examiner*—Leo H. Boudreau
*Attorney, Agent, or Firm*—Posnack, Roberts, Cohen & Spiecens

[57] ABSTRACT

A method and apparatus for automatically identifying paper currency, stocks, stamps, and the like, by optically examining and viewing regions on the currency. The graphic pattern scanned is stored as signal information and then compared with signals representing predetermined standard information on the pattern of the currency. An identification is obtained upon the concurrence of a predetermined amount of the two information signals being compared. The system can accommodate lateral shifts of the currency and skew angles of arrival of the currency, and still provides a suitable identification. In the case of lateral shifts, it can either compensate for the shift or provide comparisons with a plurality of standard information signs, each for a different lateral displacement. In the case of the skew angle, it can compare the scanned information with a stored file of different patterns, each representing a different skew angle, or can use statistical mathematics to provide a tentative identification which is then used to select a proper memory file. The system can be used either to sort currency, or to identify a particular denomination while rejecting all other currency denominations.

35 Claims, 9 Drawing Figures

AUTOMATIC CURRENCY IDENTIFICATION SYSTEM

BACKGROUND OF THE INVENTION

This invention relates to currency handling machines, and, more particularly, to a method and apparatus for automatically identifying types of currency.

Automatic currency identifying systems are becoming more and more prevelant with the increase need for automation in currency handling. Broadly, two types of such systems are used. In a first of such systems, a particular type of currency, such as a specific dollar denomination, is automatically counted while all other dollar denominations are rejected. In a second type of such system, all the currencies are accepted and are sorted based upon their denomination. In each of these machine types, however, the basic idea is the same, namely, to be able to accurately identify indicia on the currency to provide a proper determination of its denomination or type.

In many prior art systems, the currency is scanned either in total or in part to determine information about the currency and compare this information to stored information. However, in these prior art systems, the information and comparison is carried out at a testing station where the information detected is directly compared with the stored information. As a result, the currency must be momentarily stopped at which time the comparison can be carried out. Such momentary stoppage provides a non-uniform flow of the currency and results in difficulties during high speed operation. Additionally, if the currency was even partially mutilated, cut or smeared, the prior art devices would not be able to provide an identification of the currency and the currency was rejected.

A further problem is that the currency may tend to arrive at the detection station in a non-aligned position. Lateral displacement along the transport mechanism may occur so that the scanning elements will not always be viewing the same parts of the currency. A lateral shift in the currency will cause the information to change. Additionally, the currency may arrive at a skewed angle with respect to the transport mechanism, so that again the information scanned will not always be consistent.

In many prior art mechanisms, numerous mechanical aligning devices are utilized to ensure that the currency is in an identical position for each scanning operation. Should currency arrive in a position other than the standard aligned position, the currency will normally be rejected. However, such aligning equipment makes the operation of the transport mechanism more complex and prone to breakdown. Also, it results in the rejection of a great number of the currency thereby requiring the constant monitoring of the automatic system by personnel. As a result, the prior art mechanisms are not fully automatic in that a great amount of the currency must still be counted and identified manually.

It is understood that in the present specification and claims, that the term "currency" is utilized in the broad sense, and includes all paper currency, stock certificates, bonds, stamps and similar items generally requiring identification, and, especially those items which have uniform patterns representing particular denominations or types.

SUMMARY OF THE INVENTION

It is, accordingly, an object of the present invention to provide an automatic currency identifying system which avoids the aforementioned problems of prior art devices.

A further object of the present invention is to provide an automatic currency identifying system which scans the currency and stores the scanned information to compare the stored scanned information with predetermined standard information, thereby permitting identification of the currency "on the fly" and permitting more time for analysis and processing of the data.

A further object of the present invention is to provide an automatic currency identifying system which can accommodate lateral shifts and angular skewing of the currency.

Still another object of the present invention is to provide an automatic currency identifying system which scans the currency to determine information about a portion of its graphic pattern, its lateral displacement and its skew angle.

It is another object of the present invention to provide an automatic currency identifying system which can be used to sort currency based upon the denomination of the currency.

Still another object of the present invention is to provide an automatic currency identifying system which can receive a stack of currency and count those of a particular type or denomination, rejecting all other types or denominations.

Still another object of the present invention is to provide an automatic currency identifying system which detects information about the currency, including its lateral shift and skew angle, and provides an initial tentative identification of the currency based upon compensating for lateral shift and statistical analysis of the scanned information.

Another object of the present invention is to provide an automatic currency carrying system which gives two levels of identification: an initial tentative determination based upon statistical analysis, and a second, more detailed determination, based upon a full comparison with stored information.

A further object of the present invention is to provide an automatic currency identifying system which provides an output identifying the currency type when a predetermined percentage of the region scanned compares favorably with predetermined data.

Yet a further object of the present invention is to provide an automatic currency identifying system utilizing a microprocessor which is capable of providing a statistical analysis of information scanned.

These and other objects, features and advantages of the invention will, in part, be pointed out with particularity, and will, in part, become obvious from the following description of the invention, taken in conjunction with the accompanying drawings which form an integral part thereof.

Briefly, the invention provides for an automatic currency identifying system including a transport means for moving the currency past a detecting position. A scanning means at the detecting position scans a portion of the moving currency and provides scanned information about the currency. The scanned information is retained in a storage means. A memory means contains stored information concerning the currency. A comparison means compares the scanned information, as it is retained, together with the stored information in the memory means, and provides an output signal upon the concurrence of a predetermined number of items of information therebetween. A computer data processing means is also provided which can analyze and process the data for suitable comparisons.

In an embodiment of the invention, the scanning means includes means for detecting a lateral shift in the currency as well as any skew angle of the currency. A microprocessor is then utilized to control the operation of the system and provide proper identification of the currency. The microprocessor can have stored therein the information for the various denominations assuming an aligned position of the currency. Then, utilizing the information on the lateral shift and skew angle of the currency being scanned, the microprocessor can index the scanned information and rearrange it to provide corrected information which is compensated for the effect of lateral shift and/or skew angle. The compensated scanned information will then be compared with the stored information for the aligned currency.

Alternatively, the processor can rearrange the stored data based upon the scanned lateral shift and skew angle and then carry out the comparison with the actual scanned information. In addition, the microprocessor can provide a tentative or partial identification so that the incoming data need only be compared to a few patterns from memory to accurately identify the particular denomination of the currency being scanned.

In lieu of rearranging the data scanned, or the stored data, the memory in the processor can contain patterns corresponding to various degrees of lateral shift and various angles of skew, then the microprocessor can compare the scanned information with everything in the files. However, to reduce the time required for processing the data, the microprocessor can select only those files from memory which correspond to the measured lateral shift and/or skew angle for comparison with the incoming data.

DESCRIPTION OF THE PREFERRED EMBODIMENTS

Figure 1:
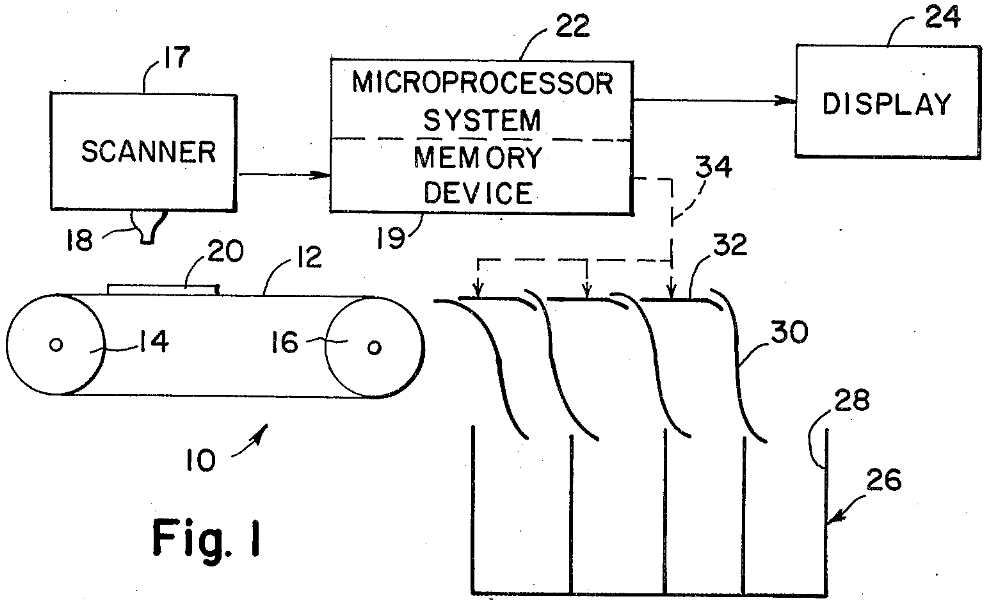
FIG. 1 is a schematic block diagram of an embodiment of the automatic currency identifying system of the present invention.

Referring now to FIG. 1, the system of the present invention includes a transport mechanism 10 having a belt 12 driven by drive wheels 14, 16. It is understood that, in general, many of the numerous types of transport mechanisms well known in the art could be utilized. A scanner 17 including a plurality of detectors 18, can be directly incorporated into the transport mechanism to scan the passing currency as they are transported from one portion of the machine to another. Alternately, the scanner can be placed separate from the transport mechanism.

The information from the detectors 18 is sent to a memory device 19 such as one included in the microprocessor system 22, which acts upon the information. Stored within the processor system are storage units containing predetermined information concerning types or denominations of currency to be identified. The storage may contain information concerning a variety of denominations of currency such as one dollar bills, ten dollar bills, twenty dollar bills, etc. The detectors can then compare the information scanned with the information stored to identify the currency being scanned. In such systems, the currency entered into the transport mechanism would include a variety of currency denominations and each particular currency would then be separately identified. Alternatively, the storage may contain information or permit operator selection of information pertaining only to a single type or denomination of currency, and the identification system will count only those bills of the particular stored denomination or type, while rejecting all other types.

The output from the microprocessor system 22 is sent to a display 24 which can display the number counted of each particular denomination or the number of bills of a particular stored or selected type or denomination.

At the end of the transport mechanism there is shown a sorter 26 having a plurality of bins 28. Slideways 30 are provided to guide the bills 20 into the appropriate bin 28. A lever or doorway 32 is placed at the opening of the various slides. The doorways 32 are controlled from the output of the microprocessor along lines 34. When the microprocessor determines that a particular denomination of bill has been identified, it will signal the corresponding doorway to open at the appropriate time permitting the bill 20 to enter into that bin. Alternately, if only a particular type of denomination is to be counted, then the microprocessor will signal the corresponding bin to accept all bills identified as being of that denomination, while rejecting all others. Although a particular sorter and transport arrangement has been shown, it is understood that any type of such apparatus could be utilized with the currency identifying system of the present invention.

Figure 2:
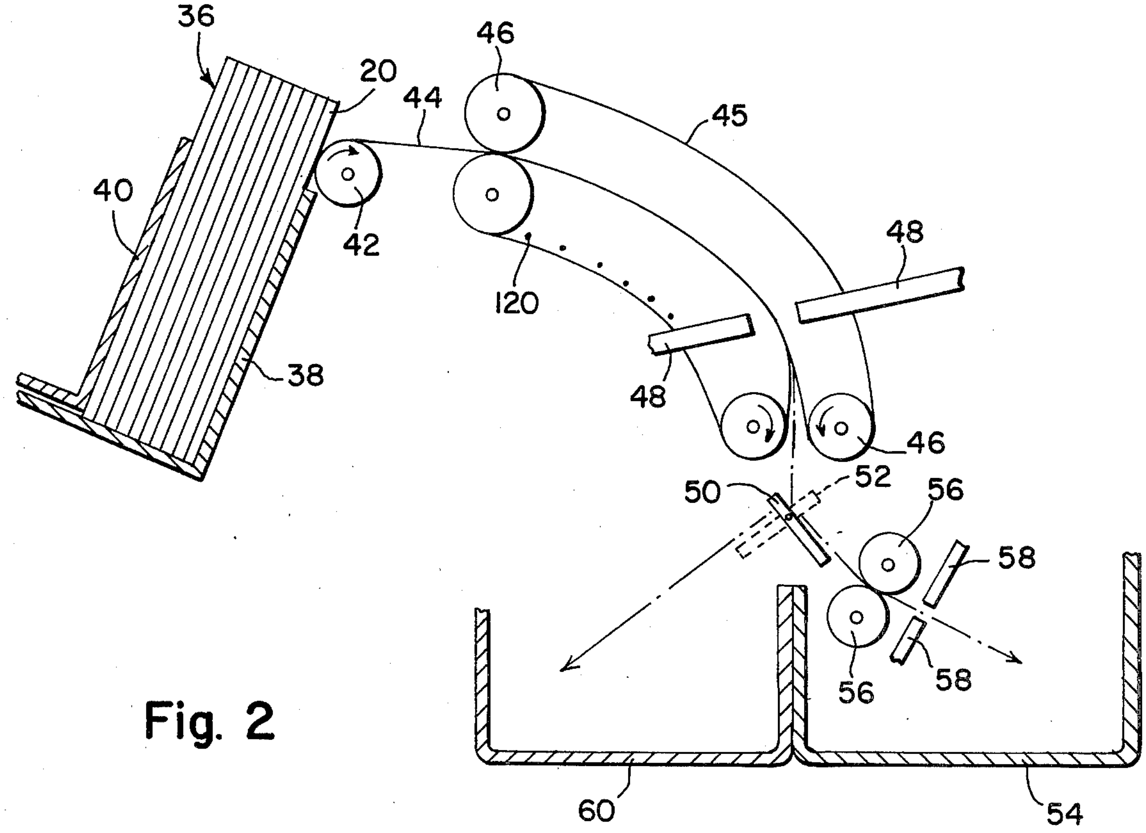
FIG. 2 is a schematic drawing of an embodiment of the transport mechanism.

A more detailed description of the transport mechanism is shown in FIG. 2 wherein there is provided a stack of bills 36 contained on a support 38 and held by means of a pressure lever 40. A vacuum roller 42 initially pulls the bills 20 onto the transport surface 44 and is then carried on the belt 45 driven by the rollers 46. As the bill passes the detectors 48, the denomination is identified and the result used to control a lever having a first position 50 shown in solid lines, and a second position 52 shown in dotted lines. In its first position 50, the bill will pass into bin 54 past the rollers 56 and the counters 58. This bin holds the bills that are accepted and counts them. When the lever is in position 52, the bill will pass into the bin 60 containing the rejected bills. The position control of the lever will be determined by the output from the detectors which output has been processed through comparitors in the microprocessor.

The scanning mechanism consists of a plurality of electro-optical devices. Each device contains a light source, for example a light emitting diode, and a photoresponsive receiver, for example a phototransistor. Light from each light source is focused on the surface of the currency to be identified, and light received therefrom is optically collected and focused on the photoreceiver. A typical electro-optical device used as an element in the sensor is the Optron Unit Model No. OPF 125 manufactured by Optron Inc., Carolton, Texas. The scanner unit can include a plurality of elements positioned to view a portion of the bill, as well as a leading edge detector, a trailing edge detector and detectors for the lateral shift, as will be hereinafter explained.

Figure 3:
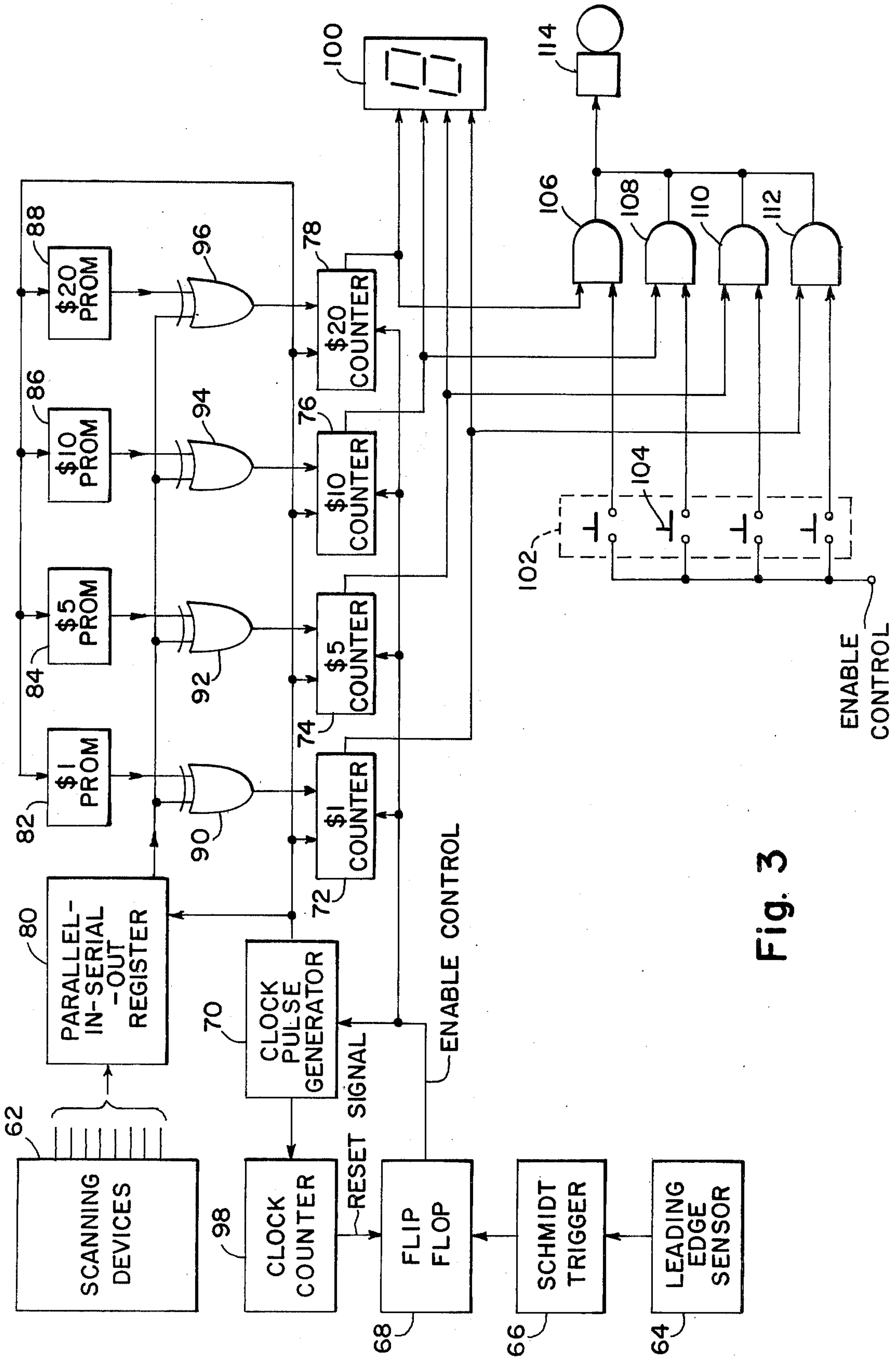
FIG. 3 is a block diagram showing a detailed embodiment of the logic useful for one embodiment of the present invention.

Referring now to FIG. 3, there is shown a simplified embodiment of the present invention. The scanning devices 62 are positioned to scan graphic patterns on the passing currency. A leading edge sensor 64 is also positioned in the detector to detect the leading edge of the graphic image on the currency. As such leading edge is detected, the signal is fed to a Schmidt trigger 66 which develops a trigger pulse controlling the flip-flop 68, which produces an enable pulse to cause the clock pulse generator 70 to begin operation. The enable pulse also is fed to the denomination counters 72, 74, 76 and 78, respectively, causing them to respectively count the number of bills of the denominations, $1.00, $5.00, $10.00 and $20.00.

The scanners 62 view the patterns and indicia on the surface of the bill. The scanners are arranged in a predetermined geometrical array so that they will view certain portions of the bill needed for proper identification. The scanners supply their output to a memory means, shown as a parallel-in-serial-out register 80.

Storage units 82, 84, 86 and 88 are respectively provided with preset information concerning the particular denominations $1.00, $5.00, $10.00 and $20.00. The storage units shown are programmable read only memories (PROMs) which contain the information concerning the bill and can be pulsed to provide serial output of the information.

The output from the clock pulse generator 70 is fed to the register 80 as well as the PROMs 82–88. The output from the register 80 is fed to a series of exclusive OR gates 90, 92, 94, 96 which respectively also receive information from each of the PROMs 82–88. The output from the exclusive OR gates 90–96 are respectively fed to the counters 72–78 which also receive the clock pulses from the clock pulse generator 70. A clock counter 98 counts the number of clock pulses and when a predetermined count has been reached, provides a reset pulse to the flip-flop 68 which then terminates operation of the clock pulse generator. The count set on the clock counter 98 is generally the same as the number of scanning elements in the scanner.

The operation of the circuit described is as follows: when the leading edge of the currency is detected, it causes the flip-flop 68 to operate the clock generator 70. The information scanned by the scanning elements 62 is stored in parallel into the register 80. The clock pulses then pulse out this information serially, bit by bit. The information in the PROMs 82–88 are also serially clocked. The exclusive OR gates 90–96 produce a bit by bit comparison of the scanned information with each of the stored information. When a bit concurrence is detected by one of the gates, it is counted in its respective counter. When a predetermined count is achieved by any counter, it will produce an output signal. The output signal can be displayed, as for example by means of the indicator display 100.

By way of example, if eight scanning elements are utilized, eight clock pulses will be generated by the clock generator 70 before the clock counter 98 turns off the generator by means of a reset pulse to the flip-flop 68. With an acceptable piece of currency being scanned, each of the clock pulses cause the gates 90–96 to compare the scanned and stored information and, with each pulse at least one of the counters 72–78 will increase its count. For example, if a $1.00 bill has been scanned, then the exclusive OR gate 90 should provide coincidence pulses between the information in the PROM 82 and the register 80. The counter 72 can be preset for a predetermined number, as for example 6. Therefore, when a minimum of 6 coincidence pulses are achieved, the counter 72 will provide an output indicating that a $1.00 bill has been scanned. In a similar manner, each of the other counters operate to count the coincidence for the denomination of the currency to which it is set.

The circuit shown in FIG. 3 can be connected to a sorter, whereby the output of each of the counters is utilized to control a lever or gate on a particular bin. When a particular counter indicates that sufficient coincidence has been reached to identify the denomination of the bill, its output will open the gate, permitting the bill to enter the bin and be properly stacked.

Alternately, it is possible to utilize the circuit shown in FIG. 3 to select a particular denomination to be accepted. Utilizing the switches 102, a particular switch can be selected in accordance with a particular denomination desired. For example, the switch 104 can be depressed, whereby the system will oniy count and accept $10.00 denominations. When the switch 104 is depressed, and when the $10.00 counter produces an output indicating that the denomination of the bill scanned is a $10.00 bill, no outputs will be provided from the gates 106–112, no alarm will be sounded, and the bill will be counted. However, should any of the other counters provide an output, or should the $10.00 counter not provide an output then the alarm 114 will be sounded, indicating that the scanned bill is not of the desired denomination. Additionally, the output can be connected to a lever or gate to place the accepted bills in one bin and the rejected bills in another bin, as shown in FIG. 2.

By setting the counters at a percentage of the total number of scanning elements, perfect agreement between the bits from the memory and those from the scanning unit is not required. In this way, variations from bill to bill or markings on the surface of the bill from usage will not prevent proper identification. The use of the storage means 80 to accept the information from the scanner, and then compare the stored information with the scanned information temporarily held in the register, is a key aspect of the invention. In this manner, the information can be obtained "on the fly". The currency need not be held during the scanning operation. The information is fed into the register in parallel format, requiring only a few microseconds to register the data from the bill into the register 80. The remaining time, while the bill is in transit and before the next bill enters the scanner, the circuitry can process the data and identify the particular denomination. The identification can, therefore, be carried out while the bill is in transit and the bill need not be held in any particular position during the processing and comparison operation.

FIG. 3 shows a simplified embodiment of the invention. However, a more complex version is also contemplated. In such a complex system, a microprocessor is utilized as the basic control means together with programmable memories connected to the microprocessor.

Figure 4A:
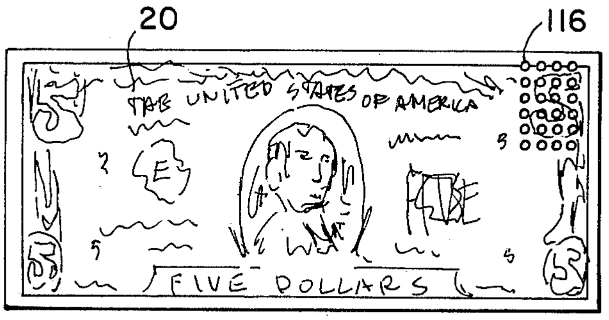
FIGS. 4*a* and 4*b* schematically explain positioning of the scanned elements.
Figure 4B:
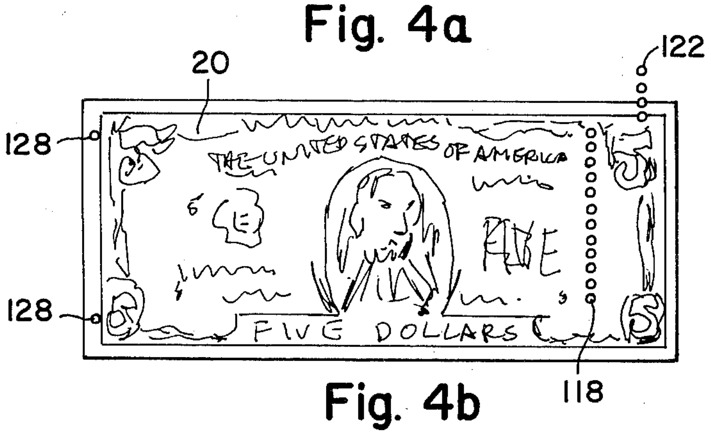

The scanning elements can be positioned in a variety of manners to detect the information from the currency. Each particular scanning element is of the electro-optical devices heretofore described. As shown in FIG. 4*a*, sensors 116 are arranged in a mosaic array pattern to cover a particular corner or area of the currency being scanned. Alternately, as shown in FIG. 4*b*, the elements can be arranged in a single row of scanner elements 118. Utilizing the single row of scanner elements, as the bill passes over the scanner, the sensors are strobed to read along several successive lines across the bill. The strobing has the effect of producing a virtual mosaic array such as is shown in FIG. 4*a*.

The strobing of the scanner elements of FIG. 4*b* would be accurately controlled in order that the lines used would be properly registered with respect to the printed images on the bill. The strobing action can be controlled by a strobe clock timer circuit. Such clock timer can be synchronized with the transport drive mechanism shown in FIG. 2. The belt can be imprinted along one edge with a series of closely spaced fiducial marks or lines, shown schematically as 120 in FIG. 2. These marks are scanned by an electro-optical sensor similar to the sensors in the actual scanning device. When the belt is in action, these marks develop a timing signal from the sensor which, in turn, is used as a synchronizing signal to control the frequency of the strobe clock timer. In this manner, the strobe timing is controlled so that the locations of the sensors viewing the lines along the bill are independent of speed variations of the transport. It is to be appreciated that the timing signal may be derived from other points in the mechanical drive system.

As with any mechanical transport, there may very well occur variations in the position of the currency with respect to the scanner. The currency usually moves in a direction transverse to the scanner. However, as it approaches the scanner, it may have a lateral shift or may by angularly skewed. As a result, the scanner may not always scan the identical area on the currency.

When using a microprocessor, it is possible to accommodate lateral shifts of the currency as it arrives at the detecting position, as well as skewing of the currency. The microprocessor can have stored in its memory, patterns corresponding to various degrees of lateral shifts and various angles of skew. When the scanned information arrives, it can be compared with all of the stored patterns in the memory in order to obtain an identification.

In order to reduce the time required for processing of the data, the lateral shift and skew angle of the currency can be measured, and based upon such measured information, the microprocessor can select only those files from memory which correspond to the measured lateral shift and/or skew angle.

The microprocessor can also be used to rearrange either the incoming data or the stored data. In this type of approach, only a single set of patterns are stored in the microprocessor memory for each denomination. The stored patterns represent the currency in an aligned position. Using the information on the lateral shift and skew angle of the detected currency, the scanned information can be indexed and compensated. The compensated information will then be compared with the stored information. Alternatively, the scanned input information will remain as detected and instead, the stored information can be indexed for comparison to the scanned information, even if the currency is shifted laterally or angularly. In addition, the microprocessor can provide a tentative or partial identification so that the incoming data need only be compared to a few patterns from memory to accurately identify the particular denomination of the currency being scanned.

The lateral displacement of the bill can be measured by means of the lateral edge position sensors 122 shown in FIG. 4*b*. These sensors, viewing the graphic or printed portion of the bill, produce one type of output which is markedly different from another output when the margin or the area not covered by the bill is viewed. The microprocessor can then use the difference in these output signal levels to determine the approximate lateral position of the bill and appropriately index the data received from the scanner. By way of example, if the scanner consists of a linear array of 12 sensors, and the lateral sensors are similar elements with the same spacing as the scanner elements, and if there is exact registration, it is assumed that only 8 elements are required for the scanner. By using only 8 elements of the 12 element array, lateral shift approximately equal to the spacing of two elements on either side can be accommodated. As the position of any bill laterally moves with respect to the scanner, the microprocessor selects data from the appropriate 8 elements of the scanner which are actually viewing the bill. By this type of indexing of the data, the information corresponding with those 8 scanner elements in approximate registration with the desired scan area are then selected for processing. This effectively eliminates the need for storing additional information for each of a plurality of lateral positions and the microprocessor need only store information corresponding to an exact registration of the bill. Lateral shifts are thereby compensated by indexing of the scanned information. Similarly, the stored information could have been indexed.

Figure 5A:
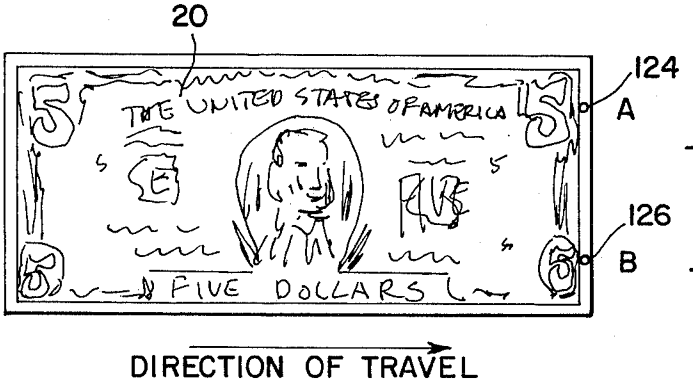
FIGS. 5*a*, 5*b*, 6*a* and 6*b* schematically explain the operation of determining the skew angle.
Figure 5B:
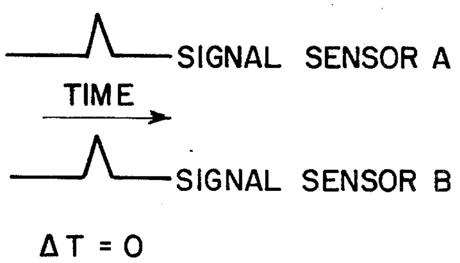
Figure 6A:
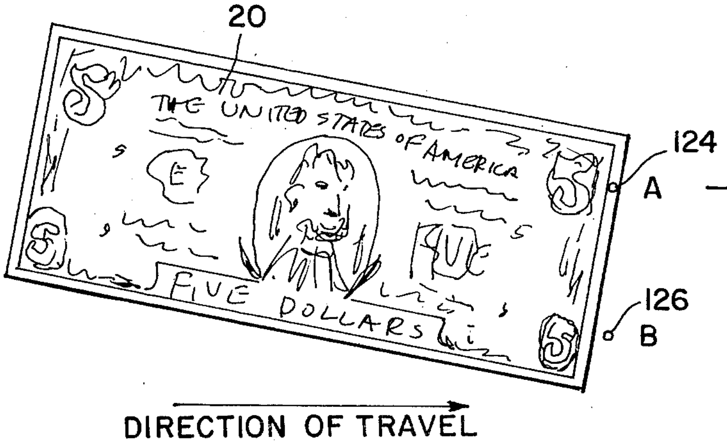
Figure 6B:
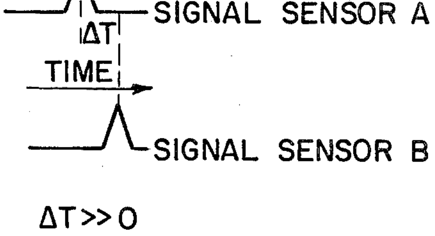

In order to reduce the information time required to determine variations in skew angle, it is first necessary to measure the skew angle involved. To achieve this, two leading edge sensors are used, shown in FIG. 5, as 124 and 126, producing outputs A and B. As shown in FIGS. 5*a* and 5*b*, when a properly aligned bill moves across the scanning elements, it will cross both leading edge sensors 124 and 126 at approximately the same time. As a result, the signals A and B will occur at substantially identical times, with no time difference therebetween. However, as shown in FIGS. 6*a* and 6*b*, if the bill approaches with a skew angle, it will cause one of the sensors to produce an output before the other. For the direction of skew shown in FIG. 6*a*, sensor 124 will produce the A output before sensor 126 will produce its B output. As a result, a time difference, $\Delta T$, will occur, as shown in FIG. 6*b*. Combining this information with information on the speed of the transport mechanism, as described earlier in connection with the timing signals on the transport device, it is possible to convert the time displacement, $\Delta T$, into a measure of the angle of skew.

The microprocessor system 22 can be programmed to process the incoming data in accordance with certain statistical mathematics. As a result, a tentative identification of the denomination of the bill can then be obtained. This information is then used, together with the skew angle information, to direct the computer to perform a bit by bit comparison of the incoming data together with the appropriate memory file. If the percentage of matching bits exceeds a preset level, the identification is confirmed and the appropriate identification signal is rendered. If the tentative identification and the bit by bit comparison do not agree, then no proper identification has been achieved.

In order to minimize the memory capacity required for the storage of the skew patterns, the area to be scanned is preferably located as near as possible to the leading edge of the bill. The reason for this is that for any given skew angle the linear distance subtended by this angle diminishes towards the leading edge. It has been found that there are graphic areas or geometry which are unique to each denomination. Generally, such unique areas will be used. In most cases, sufficient data for computer pattern recognition is contained in the corner of the bill where the numeral or numerals designating the denomination normally appear. In addition, it is to be noted that the numeral zone is located near the leading edge where the skew effects are minimized.

Programming of the larger memory units used with the microprocessor system can be accomplished by several methods. One method involves a graphic analysis of each denomination and type of currency to be identified in all possible orientations of lateral shift and skew angles. The analysis is preferably done with the aid of a computer wherein the computer essentially determines the optimum programming of the microprocessor memory unit.

Another method would involve using the scanner and the microprocessor system to program itself in a "learning mode". This requires the use of a large number of bills to be passed through the currency identifier and have the scanner unit scan each in a particular lateral shift and skew angle position. The data derived therefrom is then processed by the microprocessor unit to a programmable memory unit to thereby program the memory.

Referring now to FIG. 4*b*, trailing edge sensors 128 are also provided near the trailing edge of the bill to ensure that a complete or whole bill is being examined. If the trailing edge sensors 128 do not view a portion of the bill simultaneously with the leading edge sensors being triggered, then the microprocessor recognizes that a complete bill is not being viewed and the bill will be ejected in a manner similar to an unidentifiable bill.

Other sensors viewing broad areas of the bill containing predominantly white regions may be used to sense "unfit bills" by the effect of discoloration on the output of the photosensor. "Unfit bills" are usually yellowed in a normally white area due to handling. The yellowing as well as surface changes due to wrinkling and wear cause corresponding diminution in photo-response at the output of the sensors.

There has been disclosed heretofore, the best embodiments of the invention presently contemplated. However, it is to be understood that variations and modifications in the form and details of the device illustrated and in its operation may be made by those skilled in the art without departing from the spirit of the invention. It is the intention, therefore, to be limited only as indicated by the scope of the claims appended hereto.

What is claimed is:

1. An automatic currency identifying system, comprising:

transport means for moving the currency past a detecting position;

scanning means at said detecting position for scanning at least a portion of the moving currency and providing scanned information about the currency;

storage means for retaining the scanned information;

memory means for storing a predetermined information concerning the currency; and comparison means for comparing the scanned information from the storage means with the stored information from the memory means and providing an output signal upon concurrence of a predetermined amount of information therebetween and further comprising processing means for analyzing the scanned information and controlling the other means, and wherein said scanning means comprises scanning elements and at least two leading edge sensors positioned at spaced apart locations transversely to moving the currency, each of said leading edge sensors producing an output when respectively detecting the leading edge of the currency, and wherein said processing means includes means for measuring the time difference between the occurrence of said leading edge sensor outputs, and timing means associated with said transport means and coupled to said processing means for providing an indication of the speed of the transport, said processing means utilizing said time difference and said speed indication to determine the skew angle of the currency.

2. A system as in claim 1 and wherein said scanning elements are positioned in a mosaic array.

3. A system as in claim 1 and wherein said scanning elements are positioned transversely to the moving currency, and further comprising strobe means for periodically energizing said scanning elements to scan successive lines of currency.

4. A system as in claim 3 and further comprising a clock timer, a timing mechanism spaced along said transport means, a timing sensor for detecting said timing means and in response thereto activating said clock timer, said clock timer being coupled to said strobe means to synchronize its operation, whereby the lines viewed are independent of speed variations of the transport means.

5. A system as in claim 1 and wherein said scanning means comprises a plurality of photo-emitting devices and associated photo-responsive devices.

6. A system as in claim 1 and further comprising trigger means responsive to at least one of said leading edge sensors for resetting said storage means upon the detection thereon of the leading edge of the currency, and clock means operating the comparison means and responsive to said trigger means for counting a predetermined number of pulses corresponding to the number of scanning elements.

7. A system as in claim 6 and wherein said storage means is a parallel-in register, said memory means are programmable read only memories (PROMS), and said comparison means includes gating means receiving the output from said register and said PROMs, and providing a coincidence output, and counter means coupled to the output of said gating means and providing said output signal upon occurrence of a predetermined number of coincidence outputs.

8. A system as in claim 1 and wherein said memory means stores information concerning a plurality of types of currency, and further comprising currency type selection means positioned along said transport means and downstream of said scanning means, said currency type selection means responsive to said output signal for accepting currency of a single type and rejecting all other currency types.

9. A system as in claim 8 and further comprising alarm means for providing an indication of the detection of a currency type rejected.

10. A system as in claim 1 and wherein said memory means stores information concerning a plurality of currency types, and wherein said output signal includes an indication of the type of currency with which coincidence occurred.

11. A system as in claim 10 and further comprising currency type selection means positioned along said transport means and downstream of said scanning means, said currency type selection means being responsive to the currency type indications of said output signal to sort the currency being scanned based upon the currency type.

12. A system as in claim 10 and further comprising display means for displaying the total count of the currency of each type detected.

13. A system as in claim 1 and wherein at least one of said scanning elements are positioned transversely across a lateral edge of the currency being scanned to thereby detect lateral variations of the currency passing across said scanning means.

14. A system as in claim 13 and wherein said memory means stores information for a plurality of lateral positions of said currency, and wherein said comparison means compares the scanned information with the stored information for each stored lateral position, said output signal being produced upon concurrence with any one of said stored lateral position information.

15. A system as in claim 1 and wherein said processing means includes means for indexing said scanned information to compensate for any lateral variations and skew angle, said compensated scanned information being utilized in said comparison means.

16. A system as in claim 1 and wherein said processing means includes means for indexing said stored predetermined information to accommodate for any lateral variations and skew angle, the scanned information being compared to said indexed information.

17. A system as in claim 1 and wherein said processing means further includes means for determining the direction of the skew angle by detecting the order of activation of said leading edge sensors.

18. A system as in claim 1 and wherein said memory means stores information for a plurality of skew angles and lateral shifts of said currency, and wherein said comparison means compares the scanned information with the stored information for each stored skew angle and lateral shift, said output signal being produced upon comparison with any one of said stored skew angle and lateral shift information.

19. A system as in claim 1 wherein said scanning elements are positioned to scan an area of the currency near its leading edge.

20. A system as in claim 1 and wherein said scanning means further comprises near trailing edge sensors, and further comprising means for preventing an output signal when the leading edge sensors detect the presence of currency and the near trailing edge sensors do not detect the presence of currency.

21. A system as in claim 1 and wherein said scanning means comprises means for detecting patterns identifying the currency, means for detecting the lateral displacement of the currency, and further comprising microprocessor means for receiving the information from the scanning means and processing the information to provide corrected information suitable for comparison with said stored information.

22. A method of identifying currency passing along a transport mechanism, comprising the steps of:

scanning the currency to provide scanned information about the currency;

storing the information scanned;

comparing the stored information with predetermined standard information about the currency;

providing an identification signal based upon the coincidence of a preselected minimum amount of information therebetween, wherein said step of scanning includes the step of detecting the skew angle of the currency by determining the time and order of displacement between the occurrence of outputs from two spaced apart leading edge detectors, obtaining an indication of the speed of the transport mechanism, and calculating the skew angle and direction using the speed indication and time displacement.

23. A method as in claim 22 and wherein said step of scanning includes the step of detecting a lateral displacement of the currency, and further comprising the step of indexing the information scanned to compensate for a lateral shift, and wherein said corrected information is utilized for said comparing step.

24. A method as in claim 22 and wherein said step of scanning includes the step of detecting a lateral displacement of the currency, and further comprising the step of indexing the stored information in accordance with the lateral displacement, and wherein said corrected information is utilized for said comparing step.

25. A method as in claim 22 and wherein said step of scanning includes the step of detecting a lateral displacement of the currency, wherein said standard information includes information for each of a plurality of lateral positions of the currency, and wherein said step of comparing is carried out for each of the lateral positions, said identification signal being produced upon a concurrence from any of the comparisons.

26. A method as in claim 22 and wherein said step of scanning includes the step of detecting the skew angle of the currency.

27. A method as in claim 22 and further comprising the step of processing the scanned information by using statistical mathematics to obtain a preliminary identification of the currency and utilizing said preliminary identification to limit the number of comparisons needed for identification thereby increasing the speed of processing.

28. A method as in claim 22, and wherein said standard information includes information for each of a plurality of skew angles of the currency, and wherein said step of comparing is carried out for appropriate skew angles, said identification signal being produced upon a concurrence from any of the comparisons

29. The method as in claim 22 and wherein said step of scanning includes the steps of strobing a transverse row of scanning elements as the currency passes to view successive lines of the currency, determining the speed of the transport mechanism, and controlling the strobing based upon the speed determined, whereby the lines viewed are independent of speed variations of the transport.

30. A method as in claim 22 and wherein the standard information includes information concerning a plurality of currency types, and wherein said identification signal includes an indication of the type of currency detected.

31. A method as in claim 30 and further comprising the step of sorting the currency based upon the indication of the currency type from the identification signal.

32. A method as in claim 30 and further comprising the step of selecting a single currency type from said plurality of currency types, and accepting the currency of said single type while rejecting all other currency types.

33. A method as in claim 22 and further comprising the step of analyzing the scanned information to provide a tentative identification of the currency type prior to said comparision step.

34. A method as in claim 22 and wherein said step of scanning includes the step of viewing an area of the currency near the leading edge thereof.

35. A method as in claim 22 and further comprising the step of obtaining the standard information in a learning mode by utilizing the currency identifying system itself.

* * * * *